Patented June 10, 1930

1,763,293

UNITED STATES PATENT OFFICE

HAROLD WALTER ELLEY, OF WILMINGTON, DELAWARE, ASSIGNOR TO E. I. DU PONT DE NEMOURS & COMPANY, OF WILMINGTON, DELAWARE, A CORPORATION OF DELAWARE

RUBBER COMPOSITION AND METHOD OF PRESERVING RUBBER

No Drawing.    Application filed December 7, 1927.   Serial No. 238,463.

This invention relates to the art of preserving rubber and rubber articles against deterioration due to aging, such deterioration being commonly attributed to the effects of oxygen on the rubber or rubber article.

The invention in its preferred embodiment comprises treating the rubber with meta toluylene diamine by milling it into the rubber in the proportions of from 1 to 20 parts by weight of meta toluylene diamine to 1000 parts of rubber and then vulcanizing the rubber in the usual manner. The presence of the preservative in addition to the usual vulcanizing agent and accelerator of the non-preservative type imparts excellent age-resisting properties to the resulting vulcanized rubber.

The preservative may also be applied with good effect either before or after vulcanization by other procedures or means than by the milling operation, as by applying it in solution in a suitable solvent, such as benzene or water, to the surface of the rubber, or in the form of a finely divided paste or emulsion or by vapor treatment.

I claim:

1. The method of inhibiting the oxidation of rubber which comprises incorporating therewith, in addition to a vulcanizing agent and an accelerator which is substantially a non-inhibitor of oxidation, meta-toluylene-diamine.

2. The method of inhibiting the oxidation of rubber which comprises incorporating therewith, after vulcanization, meta-toluylene-diamine.

3. A rubber compound which has been vulcanized in the presence of an accelerator which is substantially a non-inhibitor of oxidation, which compound contains meta-toluylene-diamine.

In testimony whereof, I affix my signature.

HAROLD W. ELLEY.